United States Patent [19]
Nickel

[11] 4,328,764
[45] May 11, 1982

[54] SHELLFISH MARICULTURE METHOD AND APPARATUS

[76] Inventor: William F. Nickel, R.F.D. 1, Box 262, Melfa, Va. 23410

[21] Appl. No.: 208,464

[22] Filed: Nov. 19, 1980

[51] Int. Cl.³ .............................................. A01K 61/00
[52] U.S. Cl. ...................................................... 119/4
[58] Field of Search ........................................ 119/4, 2

[56] References Cited

U.S. PATENT DOCUMENTS

| | | | |
|---|---|---|---|
| 2,853,049 | 9/1958 | Glancy | 119/4 |
| 2,989,945 | 6/1961 | Ford | 119/4 |
| 3,870,019 | 3/1975 | McNicol | |
| 3,996,894 | 12/1976 | Wiegardt, Jr. | 119/4 |
| 4,061,110 | 12/1977 | Steidle | |
| 4,170,197 | 10/1979 | Walker | 119/4 |
| 4,186,687 | 2/1980 | Gilpatric | |
| 4,231,322 | 11/1980 | Gilpatric | 119/4 |

Primary Examiner—Hugh R. Chamblee
Attorney, Agent, or Firm—Bradford E. Kile

[57] ABSTRACT

A shellfish mariculture method and apparatus wherein the apparatus includes a frame, an envelope comprising a sleeve of open mesh material having an upper and lower portion and a means operably connected to the frame for supporting an upper portion of the sleeve above a lower portion thereof.

30 Claims, 8 Drawing Figures

SHELLFISH MARICULTURE METHOD AND APPARATUS

TECHNICAL FIELD

This invention relates to nurturing shellfish such as clams, oysters, scallops and the like from an infantile seed stock stage to commercial maturity.

Shellfish have long been prized as source of edible protein. Over the decades a substantial industry has evolved which is devoted to the nurturing of infantile or seed shellfish to commercial maturity in an aquatic environment. At least for purposes of this description such shellfish husbandry will be referred to as "mariculturing."

In the art of mariculturing seed stock or infantile shellfish, such as clams, are purchased from hatcheries in containers of ten to fifteen thousand each. The typical size of such seed stock ranges from 10 mm. down to 4 mm. In the past, the seed clams would be kept alive in the containers until lowest tides were realized. In this regard, at low tides, sections of an aquatic bed can be cleared of predators such as crabs, the seeds can be planted and a protective net laid over the infantile shellfish for protection. If the planting beds never ebb bare it is, for all practical purposes, impossible to prevent small crabs from invading the growing bed and feeding on the clams beneath the protective nets. If the seed stock is fortunate enough to survive to commercial maturity of 25 to 30 mm., harvesting is achieved by commercial digging techniques.

Although the art of culturing shellfish has been widely practiced, significant disadvantages exist which impair economic development of the art. In this regard, hatcheries typically have a relatively inexpensive and plentiful supply of 4 mm. or smaller clams. This size, however, exhibits an extremely high mortality rate when cultured by conventional techniques and is extremely difficult to successfully nurture in the field. Ten mm. clams are past a critical growth stage and thus are relatively easy to nurture to maturity. Hatcheries, however, typically have only a sporadic supply of such seed which, when available, is sold at a significantly elevated price.

Some of the reasons for the high mortality rate of small shellfish comprise marine fouling, metabolic wastes and predators. Marine fouling slows water flow and thus shellfish growth and mats a covering net down, possibly smothering the seed. Marine fouling also resists wave and current action thus increasing the chance of a covering net being torn to expose the underlying shellfish to predators. In addition, infantile shellfish tend to silt themselves with their own metabolic wastes which provides a disease medium for small seeds. Further, and as previously suggested, predators such as crabs eat the shellfish seed. The crabs pass through conventional screens and nets as megalops or tiny crabs and, with a faster growth rate than shellfish, moult to a problem size.

The difficulties suggested in the preceding are not intended to be exhaustive, but rather are among many which may tend to reduce the effectiveness of prior methods and apparatus for culturing shellfish. Other noteworthy problems may also exist; however, those presented above should be sufficient to demonstrate that mariculture systems appearing in the past will admit to worthwhile improvement.

OBJECTS OF THE INVENTION

It is therefore a general object of the invention to provide a novel, mariculture method and apparatus which will obviate or minimize difficulties of the type previously described.

It is a specific object of the invention to provide a shellfish mariculture method and apparatus which can be advantageously utilized to nurture infantile 4 mm. shellfish to commercial maturity.

It is a further object of the invention to provide a shellfish mariculture method and apparatus which is adaptable to a variety of aquatic areas and conditions.

It is another object of the invention to provide a shellfish mariculture method and apparatus which is economical to fabricate, durable in an aquatic environment and facilely maintained.

It is yet a further object of the invention to provide a shellfish mariculture method and apparatus for nurturing 4 mm. or smaller infantile seed stock by:
 a. denying access to predators such as large crabs;
 b. minimizing marine fouling;
 c. facilitating elimination of metabolic wastes;
 d. minimizing ice damage; and
 e. minimizing the deleterious impact of wave, current and tidal aquatic action.

It is still another object of the invention to provide a shellfish mariculture method and apparatus which facilitates placement, movement, inspection and harvesting of the shellfish.

It is yet still a further object of the invention to provide a shellfish mariculture method and apparatus wherein the rate of shellfish growth may be regulated to a degree to take advantage of market conditions.

BRIEF SUMMARY OF A PREFERRED EMBODIMENT

A preferred embodiment of the invention which is intended to accomplish at least some of the foregoing objects entails a frame operable to be positioned within an aquatic environment. An envelope composed of an open mesh material is positioned upon the frame and operably enhouses infantile shellfish to be cultured. The interstices of the open mesh material being smaller than the infantile shellfish. A generally open dome is releasably connected to the frame and an upper portion of the envelope is releasably supported from the dome to provide a flexible chamber for the shellfish to grow which will be readily accessible to the ingress and egress of ambient water.

A method for mariculturing shellfish in accordance with the invention includes the steps of positioning a support upon the bed of a body of water and placing infantile seed shellfish within a generally open mesh envelope having interstices smaller than the shellfish. The method further includes the steps of depositing the envelope upon the support within the aquatic environment and above the bed of the body of water and maintaining an upper portion of the envelope above a lower portion thereof to form a flexible chamber for permitting the facile ingress and egress of water through the envelope and around the shellfish being nutured therein.

BRIEF DESCRIPTION OF DRAWINGS

Other objects and advantages of the invention will become apparent from the following detailed description of a preferred embodiment thereof taken in conjunction with the accompanying drawings, wherein:

FIG. 1 is an axonometric view of a shellfish mariculture system of the subject invention positioned upon a water bed in two to three feet of water in a shallow estuary or the like;

DETAILED DESCRIPTION

Figure 1:
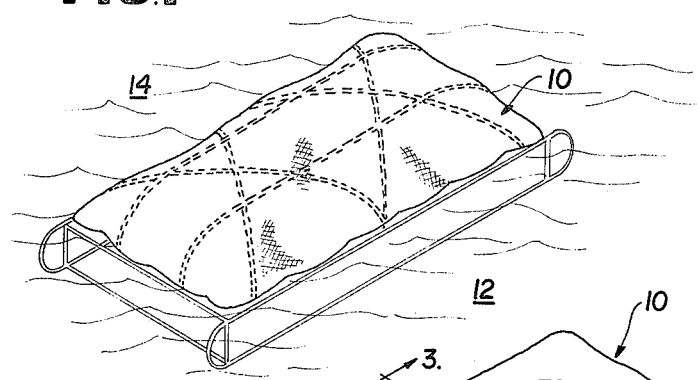

Referring now to the drawings, wherein like numerals designate like parts, FIG. 1 discloses a shellfish mariculture apparatus 10 in accordance with a preferred embodiment of the subject invention positioned upon the bed 12 of an estuary in two or three feet of water 14. In a preferred system, the mariculture apparatus is placed in water 18" to 0" at low tide, however, the subject apparatus may also be advantageously employed in water depths of 9' or deeper.

Figure 2:
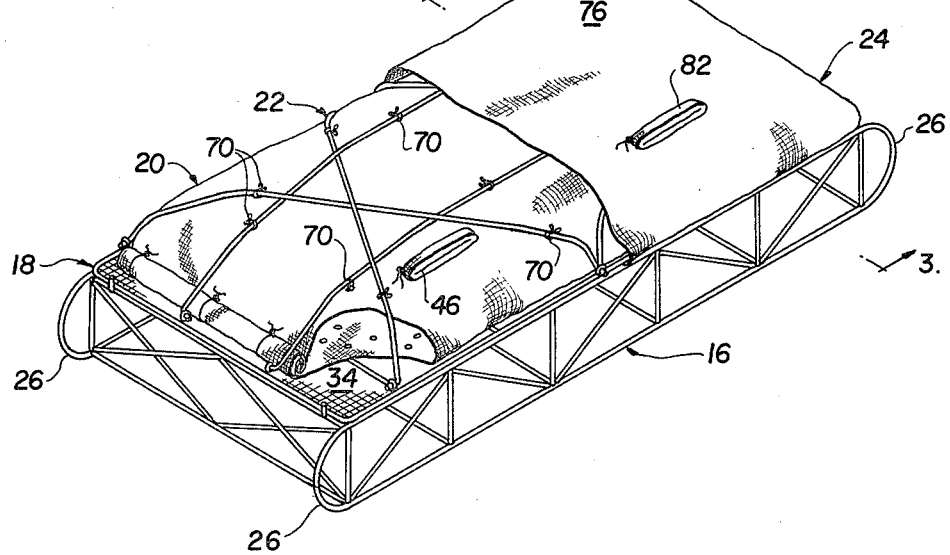
FIG. 2 is a detailed axonometric view of the shellfish mariculture system which has been partially broken away to reveal internal detail of the subject system.

Referring to FIG. 2 it will be seen that the shellfish mariculture apparatus includes a support sled 16, a generally rectangular frame 18, a first open mesh envelope 20, a releasable dome 22 and a second open mesh envelope 24.

The support sled 16 is preferably fabricated from bar stock such as three eighths to five-eighths reinforcing bar or smooth bar stock. The bar stock is welded with suitable structural bracing into an open support structure wherein imaginary extensions of the external elements of the structure generally define a solid rectangle. An arcuate member 26 is connected as a longitudinal extension at each of the corners of the support sled 16 and facilitate repositioning the sled in a marine environment. In the alternative it would be possible to utilize a plurality of separate stands which would collectively serve as a support base.

Figure 3:
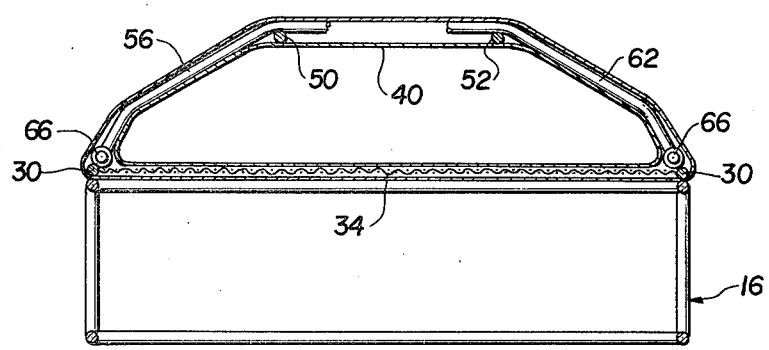
FIG. 3 is a cross-sectional view taken along section line 3—3 in FIG. 2 and discloses internal detail of the subject mariculture system.
Figure 4:
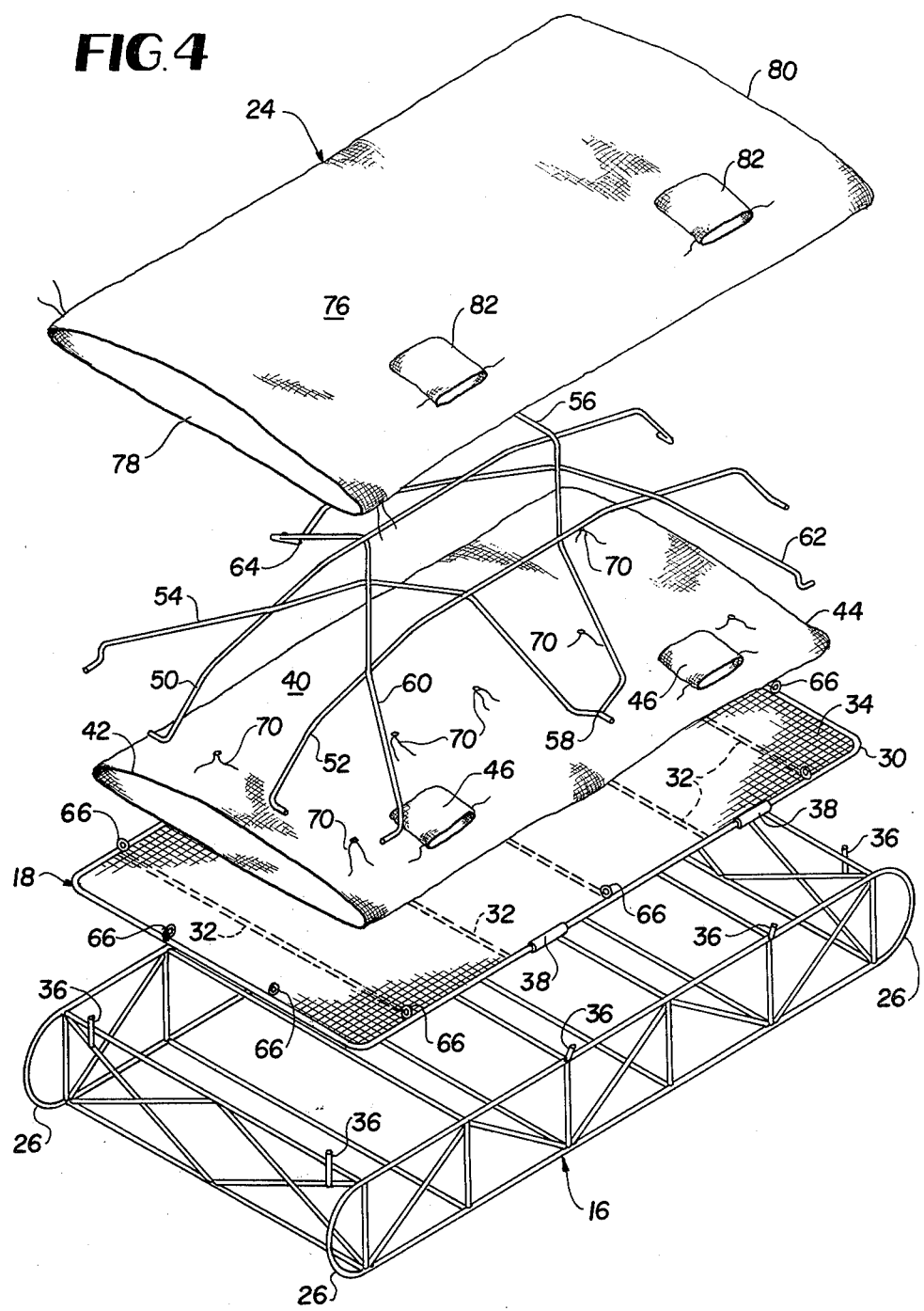
FIG. 4 is an exploded axonometric view disclosing the various structural details of the invention including a sled support, a generally rectangular frame, a first open mesh envelope, a releasable dome network and a second open mesh envelope.

A rectangular frame 18 is supportingly received upon an upper portion of the sled 16 (note FIGS. 2-4). The frame includes an outer generally rectangular member 30 composed of bar stock or the like and a plurality of transversely crossing members or braces 32. A relatively heavy rectangular sheet of mesh material 34 is mounted on top of the rectangular member 30 and transverse braces 32. The sheet of mesh 34 serves as a support for the first open mesh envelope 20 as will be discussed more fully below.

Figure 6:
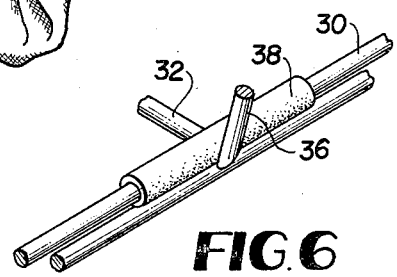
FIG. 6 is a detail view of the frame section resting upon the sled support.

As previously noted, the rectangular frame 18 is designed to rest upon and be supported by the sled 16. In order to facilitate connection of the two members, generally vertically oriented brace rods 36, with a slight outward slope, project from the perimeter of the sled 16. Resilient tubular sleeves 38 are mounted at corresponding locations on the frame 30 and operably connected the sled and the frame together, note FIGS. 4 and 6.

In a preferred embodiment the brace members 32 are curved to form a generally concave support for the mesh material 34. This concave configuration induces the shellfish to gravitate toward a central portion of the frame and minimize any aquatic induced tendencies for the shellfish to collect in corner locations. Moreover the rectangular sheet of mesh material 34 is preferably selected to be oversized so as to permit individual mesh sections between adjacent braces 32 to be concave and facilitate retaining a generally even distribution of shellfish across the frame.

A first open mesh envelope 20 is positioned upon and connected to the frame 18. This envelope 20 comprises a sleeve 40 of open mesh material such as Dupont's VEXAR plastic netting. The interstices of the netting are dimensioned to have an effective opening across an interstice less than that of the size of shellfish to be nurtured. A preferred size ratio is for the interstices to be one-half the size of the shellfish at the time of initiation of the culturing process. Accordingly when 4 mm. clams are being cultured, a one-eighth inch mesh is chosen. In this regard it has been found that if crab megalops enter the first envelope which are only half the size of the shellfish seed stock the growth rate of the shellfish will be sufficient to keep ahead of the developing crabs. In addition the growth rate of the tiny crabs is significantly impared in the relatively sterile environment of the envelope and crabs surrounding the net, which feed on fouling of the net, tend to eat smaller crabs before the smaller crabs enter the net. In some instances, however, it may be desirable to provide even smaller interstices openings down to one millimeter across.

Figure 5:
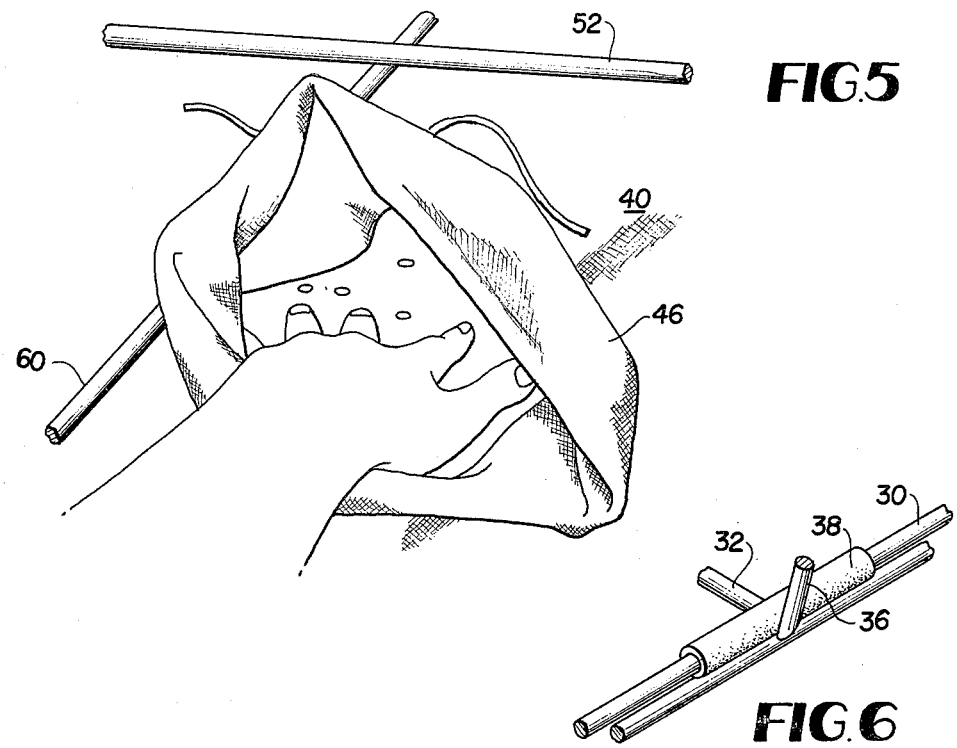
FIG. 5 is a detail view of an access member laterally opening into the first open mesh envelope.

The ends 42 and 44 of the sleeve 40 are selectively closed as by being rolled up a short distance and tied, note FIG. 2. One or more access tubes 46 of open mesh material are laterally installed into the envelope sleeve 40. These tubes 46 provide access to the interior of the envelope 20 during the placing of infantile shellfish, inspection during growth periods, removal of an occasional predator, etc. The access tubes 46 are normally closed by being rolled up and tied and may be laterally dimensioned to operably receive a hand, note FIG. 5, or the upper portion of a person's body as desired.

A generally open dome 22 is releasably connected to the frame 18 and extends above the first open mesh envelope 20. The dome 22 is composed of an intermeshed network of generally arcuate rods extending across the frame 30. More specifically, in a preferred embodiment, the dome 22 includes a first 50 and second 52 arcuate rod which extends from end to end of the frame 30. A first pair of crossing rods 54 and 56 extend from one pair of adjacent corners respectively of the frame 30 and join as at 58 at approximately a midportion of the opposite side of the frame 30. In a symmetrical and converse manner, a second pair of crossing rods 60 and 62 extend from an opposing pair of adjacent corners respectively of the frame 30 and join as at 64 at approximately a mid portion of the opposite side of the frame 30.

Figure 7:
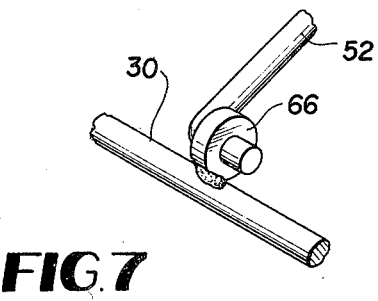
FIG. 7 is a detail view of a pivotal releasable connection of a longitudinally extending dome rod with an end portion of the rectangular frame.
Figure 8:
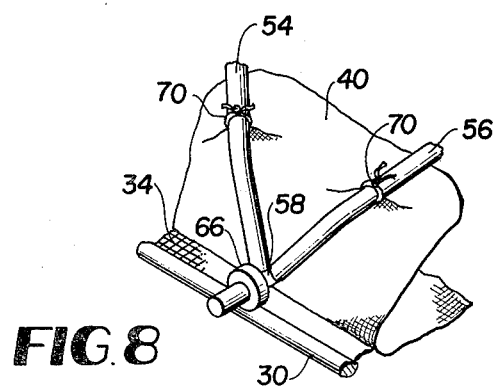
FIG. 8 is a detail view of a pivotal, releasable connection of a transverse dome rod with a lateral portion of the frame.

Each of the rods are generally arcuate and are pivotally received within eyelet mountings 66 welded onto the frame 30. In this connection, FIG. 7 illustrates a detail view of longitudinal rod 52 being pivotally received within eyelet 66. In a similar manner, FIG. 8 discloses crossing rods 54 and 56 being joined and pivotally mounted within a lateral eyelet 66.

The rods are dimensioned to extend in an unstressed state a distance greater than opposing mounting eyelets. Accordingly when the arcuate rods are mounted on the frame they are placed in compression and are self biasing into the pivotal mounting eyelets 66. In addition, the rods are advantageously intertwined to form a relatively stable network. More specifically longitudinal rod 50 extends under crossing rods 54 and 56 over rods 60 and 62. Longitudinal rod 52, on the other hand extend under rods 60 and 62 and over rods 54 and 56. The net result of the self biasing, intertwining, pivotal mounting aspects of the arcuate rods is to create a relatively stable dome 22 which is flexible enough to bend and give under wave action, currents, tides and the like and thus exhibit a degree of flexion in an aquatic environment.

An upper portion of the first open mesh envelope 20 is releasably suspended from the dome 22 by a plurality of quick release ties 70. These ties operably secure the first envelope 20 to the dome network 22, note FIGS. 2 and 8.

A second mesh envelope 24 operably encompasses the frame 18, the first open mesh envelope 20 and the dome 22. This envelope is similar to envelope 20 and comprises a sleeve 76 of open mesh material such as VEXAR plastic netting. The interstices of this netting are larger than the interstices of the first envelope and in a preferred embodiment the ratio of interstices size is about two.

The ends 78 and 80 of the sleeve 76 are selectively closed as by being rolled up a short distance and tied. One or more access tubes 82 of open mesh material are laterally installed into the interior of the envelope sleeve 76. These tubes 82 provide in cooperation with similar tubes 46 access into the interior of the first and second envelopes as previously discussed.

In operation, the mariculture apparatus may be stocked with shellfish seed and placed in an aquatic location at any time but preferably in the fall. During an eighteen month to two year growth period the shellfish may be facilely examined by an operation through the access tubes 46 and 82. The interstices of the envelope are selected to inhibit predator entry. An occasional intruder may be removed during periods of inspection.

During the winter season ice formation and damage has been a problem with prior systems. In the subject system the apparatus is winterized by release of the outer envelope 24 and removal of the dome network 22 from the frame 18. The outer envelope is then replaced over the frame 18 and the first envelope 20 for protection.

The frame and both envelopes are then laid directly upon the waterbed. With this low profile the apparatus silts over, to a degree, and ice tends to pass over top of the unit. In the event ice does form upon the netting the black colored plastic tends to absorb solar radiation and be self releasing. In the spring the unit is raised, the dome is reinserted and the frame is repositioned upon the sled for a growth season.

SUMMARY OF MAJOR ADVANTAGES

After reading and understanding the foregoing description of the invention, in conjunction with the drawings, it will be appreciated that several distinct advantages of the subject shellfish mariculture method and apparatus are obtained.

Without attempting to set forth all of the desirable features of the instant system at least some of the major advantages of the invention include the unique combination of a frame member with a releasable dome, both of which support an open mesh envelope having interstices sized to be less than the size of shellfish to be cultured. In a preferred embodiment the interstices are sized with one-eighth inch openings to grow 4 mm. shellfish in an environment where predators are effectively denied access.

The support (sled or plurality of stands) and frame elevate the shellfish above a marine floor and facilitate elimination of metabolic wastes as the shellfish mature. Moreover crabs do not tend to climb to elevations a foot or so above the bottom.

The dome is raised and an upper portion of the envelope is exposed during low tides to deter marine growth and inhibit marine fouling. The dome is further pivotally connected to the frame such that waves, currents and tides will tend to flex the dome and permit aquatic energy to pass through the structure while not damaging the same.

Still further the dome is resiliently mounted on the frame and is facilely releasable. This releasable character of the dome enables the system to be winterized with minimum damage.

The concave character of the frame and the individual concave nature of each mesh support section between adjacent braces operably maintains an even distribution of the shellfish within the mariculturing apparatus.

The subject apparatus may be facilely installed at any tide, moved and inspected as desired. In addition, harvesting is facilitated and does not require laborous digging.

In the event it is desired to slow the growth rate of the shellfish, in response to a sluggish market, the frame and envelopes may be placed directly upon the bottom in a winterized mode which will inhibit growth rates.

In describing the invention, reference has been made to a preferred embodiment and illustrative advantages of the invention. Those skilled in the art, however, and familiar with the instant disclosure of the subject invention, may recognize additions, deletions, modification, substitutions and/or other changes which will fall within the purview of the subject invention and claims.

I claim:

1. A shellfish mariculture apparatus for nurturing clams, oysters, scallops and the like from an infantile seed stage to commercial maturity, said apparatus comprising:
   frame means operable to be positioned within an aquatic environment;
   envelope means positioned upon said frame means and being generally coextensive therewith for enhousing shellfish during a nurturing period, said envelope means including
      a sleeve of open mesh material operable to be laid laterally upon said frame means having a lower portion supported by said frame means,
      said sleeve being operably closed at the ends thereof and the interstices of said open mesh material being smaller than the infantile shellfish to be nurtured within said envelope means; and means operably connected to said frame means for supporting an upper portion of said sleeve above said lower portion thereof.

2. A shellfish mariculture apparatus for nurturing clams, oysters, scallops and the like as defined in claim 1 wherein said frame means comprises:
a generally rectangular frame having crossing elements and an overlying grid for supporting said envelope means.

3. A shellfish mariculture apparatus for nurturing clams, oysters, scallops and the like as defined in claim 2 wherein:
said crossing elements are curved downwardly so as to form a generally concave support surface for said overlying grid upon said generally rectangular frame.

4. A shellfish mariculture apparatus for nurturing clams, oysters, scallops and the like as defined in claim 2 or 3 wherein:
said overlying grid comprises a flexible mesh and having planar rectangular dimensions greater than said frame such that individual concave portions will be formed by said flexible mesh grid between adjacent crossing elements.

5. A shellfish mariculture apparatus for nurturing clams, oysters, scallops and the like as defined in claim 1 wherein:
said interstices of said open mesh material are approximately equal to one-half the size of infantile shellfish at initiation of the nurturing process.

6. A shellfish mariculture apparatus for nurturing clams, oysters, scallops and the like as defined in claim 1 wherein:
said interstices of said open mesh are approximately one-eighth of an inch across.

7. A shellfish mariculture apparatus for nurturing clams, oysters, scallops and the like as defined in claim 1 wherein said generally open dome means comprises:
a network of generally arcuate rods extending across said frame means.

8. A shellfish mariculture apparatus for nurturing clams, oysters, scallops and the like as defined in claim 7 wherein:
said arcuate rods being pivotably connected to said frame means.

9. A shellfish mariculture apparatus for nurturing clams, oysters, scallops and the like as defined in claim 8 wherein:
said arcuate rods are self biasing into engagement with pivotal mountings affixed at a plurality of peripheral locations on said frame means.

10. A shellfish mariculture apparatus for nurturing clams, oysters, scallops and the like as defined in claim 1 wherein said means to receive and support said frame means comprises:
means positionable upon the bed of a body of water and being operable to receive said frame means and support said frame means above the bed of the body of water.

11. A shellfish mariculture apparatus for nurturing clams, oysters, scallops and the like as defined in claim 10 wherein said means to receive and support said frame means comprises:
a sled constructed of rod members wherein imaginary planes lying upon structural extremities of said rod members form a generally solid rectangular configuration, sled having arcuate end members fashioned as longitudinal extensions at each of the corners of said sled.

12. A shellfish mariculture apparatus for nurturing clams, oysters, scallops and the like as defined in claim 1 wherein:
said interstices of said open mesh are approximately one millimeter across.

13. A shellfish mariculture apparatus for nurturing clams, oysters, scallops and the like from an infantile seed stage to commercial maturity, said apparatus comprising:
support means operable to be positioned upon the bed of a body of water and extend upwardly within the body of water;
frame means operable to be laid upon said support means within the body of water;
first envelope means positioned upon said frame means for enhousing shellfish during a nurturing period, said envelope means including
a sleeve of open mesh material operable to be laterally laid upon said frame means, said sleeve being releasably closed at the ends thereof and the interstices of said open mesh material being smaller than the infantile seed shellfish to be nurtured within said first envelope,
means mounted upon said frame means and being operable to support an upper portion of said first envelope means above a lower portion thereof disposed upon said frame means, said means being generally open to facilitate the ingress and egress of water through said first envelope means; and
second envelope means positioned about said frame means, said means to support an upper portion of said envelope and said first envelope means, said second envelope means including
a sleeve of open mesh material and being releasably closed at the ends thereof and the interstices of said open mesh material of said larger than the interstices of said open mesh material of said first envelope means.

14. A shellfish mariculture apparatus for nurturing clams, oysters, scallops and the like as defined in claim 13 and further comprising:
first means operably opening into a lateral portion of said first envelope means to provide access through said sleeve of open mesh material into said first envelope means; and
second means operably opening into a lateral portion of said second envelope means to provide access through said sleeve of open mesh material of said second envelope means.

15. A shellfish mariculture apparatus for nurturing clams, oysters, scallops and the like as defined in claim 13 wherein:
said interstices of said open mesh material of said first envelope means being approximately one half the size of infantile seed shellfish to be nurtured within said first envelope means.

16. A shellfish mariculture apparatus for nurturing clams, oysters, scallops and the like as defined in claim 13 wherein:
said interstices of said open mesh material of said first envelope means being approximately one-eighth of an inch across; and
said interstices of said open mesh material of said second envelope means being approximately one-quarter of an inch across.

17. A shellfish mariculture apparatus for nurturing clams, oysters, scallops and the like as defined in claim 13 wherein said support means comprises:
a sled fabricated from rod members wherein imaginary planes lying upon the structural extremities of said rod members generally forming a solid rectangular configuration, said sled having arcuate extensions longitudinally projecting from each of the corners thereof.

18. A shellfish mariculture apparatus for nurturing clams, oysters, scallops and the like as defined in claim 17 wherein said frame means comprises:
a generally rectangular frame composed of rod material and having transversely positioned support members extending between the long sides of said rectangular frame and a sheet of open mesh material overlaying sid frame and transverse members for supporting said first envelope means.

19. A shellfish mariculture apparatus for nurturing clams, oysters, scallops and the like as defined in claim 13 wherein said means to support an upper portion of said first envelope means comprises:
a network of generally arcuate rods extending across said frame means and being connected to the edges of said frame means.

20. A shellfish mariculture apparatus for nurturing clams, oysters, scallops and the like as defined in claim 19 wherein:
said arcuate rods are releasably connected to said frame and being self biased into engagement with said frame means.

21. A shellfish mariculture apparatus for nurturing clams, oysters, scallops and the like as defined in claims 19 or 20 wherein:
said arcuate rods being pivotally connected to said frame such that said dome may exhibit a degree of flexion in an aquatic environment.

22. A shellfish mariculture apparatus for nurturing clams, oysters, scallops and the like as defined in claim 21 and further comprising:
a plurality of means for releasably attaching an upper portion of said first envelope means to said network of generally arcuate rods.

23. A shellfish mariculture apparatus for nurturing clams, oysters, scallops and the like as defined in claim 19 or 20 wherein:
said frame means is generally rectangular; and
said network of arcuate rods includes at least two longitudinally oriented arcuate rods extending from one end of said frame to the other and at least two arcuate rods extending transversely
from each side of said rectangular frame, at respective corners thereof, to generally a mid point on an opposite side of said generally rectangular frame, said longitudinal and transversely extending rods being intertwined to form a self supporting dome structure.

24. A method for mariculturing shellfish such as clams, oysters, scallops and the like from an infantile seed stage to commercial maturity, said method comprising the steps of:
positioning a support upon the bed of a body of water wherein said support projects upwardly within an aquatic environment;
placing infantile seed shellfish within a flexible envelope of generally open mesh material wherein interstices of said open mesh material being less than the size of the infantile seed shellfish to be nurtured;
depositing the flexible envelope upon the support within the aquatic environment and above the bed of the body of water; and
operably placing means upon the support for maintaining an upper portion of the flexible envelope lifted above a lower portion thereof resting upon the frame for permitting the ingress and egress of water through the envelope and around the shellfish being nurtured therein.

25. A method for mariculturing shellfish such as clams, oysters, scallops and the like as defined in claim 24 wherein said step of placing comprises:
depositing infantile seed shellfish within an open mesh envelope having interstices sized to be approximately one millimeter across.

26. A method for mariculturing shellfish such as clams, oysters, scallops and the like as defined in claim 24 wherein said step of placing comprises:
placing infantile seed shellfish within an open mesh envelope having interstices sized approximately equal to one-half the size of the infantile seed shellfish.

27. A method for mariculturing shellfish such as clams, oysters, scallops and the like as defined in claim 24 wherein said step of placing comprises:
depositing infantile seed shellfish within an open mesh envelope having interstices sized to be approximately one-eighth inch across.

28. A method for mariculturing shellfish such as clams, oysters, scallops and the like from an infantile seed stage to commercial maturity, said method comprising the steps of:
positioning a support upon the bed of a body of water wherein said support projects upwardly within an aquatic environment;
placing infantile seed shellfish within an envelope of generally open mesh material wherein interstices of said open mesh material being less than the size of the infantile seed shellfish to be nurtured;
depositing the envelope upon the support within the aquatic environment and above the bed of the body of water; and
maintaining an upper portion of the envelope lifted above a lower portion thereof resting upon the frame for permitting the ingress and egress of water through the envelope and around the shellfish being nurtured therein, said step of maintaining including the steps of,
attaching releasable, arcuate rod members from side to side of said generally rectangular frame; and
releasably attaching an upper portion of the envelope to said arcuate rod members to support the upper portion of the envelope in a dome like posture.

29. A method for mariculturing shellfish such as clams, oysters, scallops and the like as defined in claim 28 and further comprising the steps of:
surrounding the frame, open mesh envelope and arcuate rod members with a second open mesh envelope having interstices larger than the interstices of said open mesh envelope.

30. A method for mariculturing shellfish such as clams, oysters, scallops and the like as defined in claim 28 and further comprising the mariculturing system by the steps of:

removing the second open mesh envelope from the frame, open mesh envelope and arcuate rod members;

releasing the open mesh envelope from support from the arcuate rods;

removing the releasable arcuate rods from the frame;

removing the frame from the support;

replacing the second open mesh envelope around the frame and open mesh envelope; and positioning the frame, open mesh envelope and second open mesh envelope directly upon the waterbed to minimize ice damage to the mariculture system during winter months.

* * * * *